US011981306B2

(12) United States Patent
Lore' et al.

(10) Patent No.: US 11,981,306 B2
(45) Date of Patent: May 14, 2024

(54) RAILWAY BRAKING DEVICE AND MANUFACTURING METHOD OF A RAILWAY BRAKING DEVICE

(71) Applicant: FAIVELEY TRANSPORT ITALIA S.P.A., Turin (IT)

(72) Inventors: Giuseppe Lore', Milan (IT); Henri Guillaume Marie De Buretel De Chassey, Turin (IT); Roberto Tione, Turin (IT)

(73) Assignee: FAIVELEY TRANSPORT ITALIA S.P.A., Turin (IT)

( * ) Notice: Subject to any disclaimer, the term of this patent is extended or adjusted under 35 U.S.C. 154(b) by 382 days.

(21) Appl. No.: 17/424,852

(22) PCT Filed: Jan. 23, 2020

(86) PCT No.: PCT/IB2020/050519
§ 371 (c)(1),
(2) Date: Jul. 21, 2021

(87) PCT Pub. No.: WO2020/152612
PCT Pub. Date: Jul. 30, 2020

(65) Prior Publication Data
US 2022/0105920 A1 Apr. 7, 2022

(30) Foreign Application Priority Data

Jan. 23, 2019 (IT) .................. 102019000000999

(51) Int. Cl.
*F15B 13/08* (2006.01)
*B33Y 10/00* (2015.01)
(Continued)

(52) U.S. Cl.
CPC ............ *B60T 15/021* (2013.01); *B33Y 10/00* (2014.12); *B60T 13/683* (2013.01); *B33Y 80/00* (2014.12)

(58) Field of Classification Search
CPC ..... B60T 15/021; B60T 13/683; B33Y 10/00; B33Y 80/00
(Continued)

(56) References Cited

U.S. PATENT DOCUMENTS 4,106,819 A * 8/1978 Hart ........................ B60T 15/42
303/82
6,234,191 B1 * 5/2001 Clarke .................... B60T 17/04
137/561 A
(Continued)

FOREIGN PATENT DOCUMENTS

CN 1689881 A 11/2005
CN 102164793 A 8/2011
(Continued)

OTHER PUBLICATIONS

Korean Intellectual Property Office, Office Action Issued in Application No. 10-2021-7023040, May 4, 2023, Korea, 13 Pages.
ISA European Patent Office, International Search Report Issued in Application No. PCT/IB2020/050519, Apr. 1, 2020, WIPO, 4 pages.

*Primary Examiner* — Christopher P Schwartz
(74) *Attorney, Agent, or Firm* — McCoy Russell LLP

(57) ABSTRACT

A manufacturing method of a railway braking device is described comprising a main body arranged to receive at least partially:
  at least two different pneumatic or electro-pneumatic elements; and
  channels connecting the at least two pneumatic or electro-pneumatic elements;
the manufacturing method comprising the step of:
  constructing said main body of the railway braking device through additive manufacturing of a monolithic block
(Continued)

provided with at least two seats for said at least two pneumatic or electro-pneumatic elements and said channels; a railway braking device is further described constructed by means of a manufacturing method of a railway braking device.

10 Claims, 6 Drawing Sheets

(51) Int. Cl.
*B60T 13/68* (2006.01)
*B60T 15/02* (2006.01)
*B33Y 80/00* (2015.01)

(58) Field of Classification Search
USPC .... 137/269, 347, 561 A, 833, 884; 188/107, 188/153 R; 303/14, 38, 46, 82, 83, 303/DIG. 10
See application file for complete search history.

(56) References Cited

U.S. PATENT DOCUMENTS

| | | | | |
|---|---|---|---|---|
| 7,357,463 | B2* | 4/2008 | Barberis | B60T 8/3235 |
| | | | | 303/DIG. 10 |
| 10,746,201 | B2* | 8/2020 | Weickel | B33Y 80/00 |
| 11,420,607 | B2* | 8/2022 | Skweres | B60T 13/665 |

FOREIGN PATENT DOCUMENTS

| | | |
|---|---|---|
| CN | 104908321 A | 9/2015 |
| CN | 107636361 A | 1/2018 |
| CN | 108136499 A | 6/2018 |
| EP | 1588913 A1 | 10/2005 |
| JP | 2005067312 A | 3/2005 |
| JP | 2017009057 A | 1/2017 |
| WO | 2010034476 A1 | 4/2010 |
| WO | 2017058237 A1 | 4/2017 |

\* cited by examiner

RAILWAY BRAKING DEVICE AND MANUFACTURING METHOD OF A RAILWAY BRAKING DEVICE

CROSS REFERENCE TO RELATED APPLICATIONS

The present application is a U.S. National Phase of International Application No. PCT/IB2020/050519 entitled "RAILWAY BRAKING DEVICE AND MANUFACTURING METHOD OF A RAILWAY BRAKING DEVICE," and filed on Jan. 23, 2020. International Application No. PCT/IB2020/050519 claims priority to Italian Patent Application No. 102019000000999 filed on Jan. 23, 2019. The entire contents of each of the above-listed applications are hereby incorporated by reference for all purposes.

TECHNICAL FIELD

The present invention is, in general, in the field of railway braking systems; in particular, the invention refers to a railway braking device and a manufacturing method of a railway braking device.

BACKGROUND AND SUMMARY

The known railway braking systems, applied on generic railway vehicles, generally consist of a plurality of pneumatic components installed on a panel, known as a pneumatic panel, which acts both as a physical support and as a pneumatic connection interface between the pneumatic components. Moreover, the panel acts as a connection interface between the pneumatic braking system and the vehicle.

In a typical braking system, the pneumatic panel mentioned above, which acts both as a physical support for the aforementioned plurality of pneumatic components installed on the panel and also a pneumatic connection interface (such as between the pneumatic components and/or between the pneumatic braking system and the vehicle), is made using traditional techniques, and a metal panel 100 supports the various pneumatic and electro-pneumatic components. The panel 100, in addition to acting as a physical support (via, for example, a support flange feature of the panel 100) for the aforesaid pneumatic components, acts as a pneumatic interface between the pneumatic components by means of connection channels 102 obtained inside the same panel. If the number of components to be supported and interfaced is limited and the dimensions of said panel are limited, for example but not exclusively less than 500 mm×500 mm×30 mm, the channels may be made through channel crossings obtained by drilling 104, as shown in FIG. 2. If the dimensions of the panels are larger or the number of connections requires a number of crossings impossible to construct, the panel 100 is instead obtained by stratifications of two or more metal layers 106 worked on the inner faces to obtain the channels 102. The metal layers are then bonded or screwed together by screwing means 108 as shown in FIG. 1.

Disadvantageously, the solutions just described have various drawbacks. First of all, they require long machining times, which is typically carried out using computer numerical control machines. The simplest solution described above, i.e. to drill channels 104, possibly crossed, is limited by the maximum dimensions that are drillable without the drill bits being able to flex during machining and missing the crossings or improperly intercepting other channels. Multilayer solutions, on the other hand, require multiple processing steps, starting from the processing to obtain the channels, to the bonding obtained by means of special glues and treatment at high temperatures to dry the glues. If the equivalent surface area represented by the channels is significantly larger than the remaining surface area available for bonding, there is a risk that the operating pressures, for example around 10 bar, will result in forces such as to cause the channels to disconnect. In this case the screwed assembly is used, but it requires sealing gaskets around each channel. This process, which is typically manual, is laborious and subject to high failure rates during production due to poor gasket installation.

A further drawback common to all the solutions described so far is represented by the final weight of the panel 100 which, added to the weight of the components, may be from 50 kg to 100 kg for each vehicle making up the train. This weight results in a high and continuous waste of energy for the operator, as the train has to continuously accelerate and decelerate this mass.

A significant integration step is represented by the solution described in EP1588913. Said patent claims the manufacture of an electro-pneumatic braking system 300 of high complexity, by means of three metal layers 302, 304, 306 as shown in FIG. 3, the two outer layers of which bear the channels 308 obtained by machining on the inner faces, and a perforated intermediate layer used to interconnect the channels on the inner faces of the outer layers. Moreover, with respect to the multi-layer solutions described above, the outer layers are machined to obtain and integrate part or all of the outer body of the pneumatic components shown in the diagram. In this way, further integration, reduction of space requirements and weight reduction are achieved. However, some of the drawbacks described above have not been resolved by this solution.

One object of the present invention is therefore to provide a solution that makes it possible to obtain a railway braking device with reduced weight, reduced processing times with respect to the known solutions, and that simplifies the construction of channels in the railway braking device.

The aforesaid and other objects and advantages are achieved, according to one aspect of the invention, by a manufacturing method of a railway braking device having the features defined in claim 1 and a braking device having the features defined in claim 5. Preferred embodiments of the invention are defined in the dependent claims, the content of which is intended as an integral part of the present description.

BRIEF DESCRIPTION OF THE FIGURES

The functional and structural features of some preferred embodiments of a manufacturing method of a railway braking system and of a railway braking device according to the invention shall now be described. Reference is made to the accompanying drawings, wherein.

DETAILED DESCRIPTION

Figure 1:
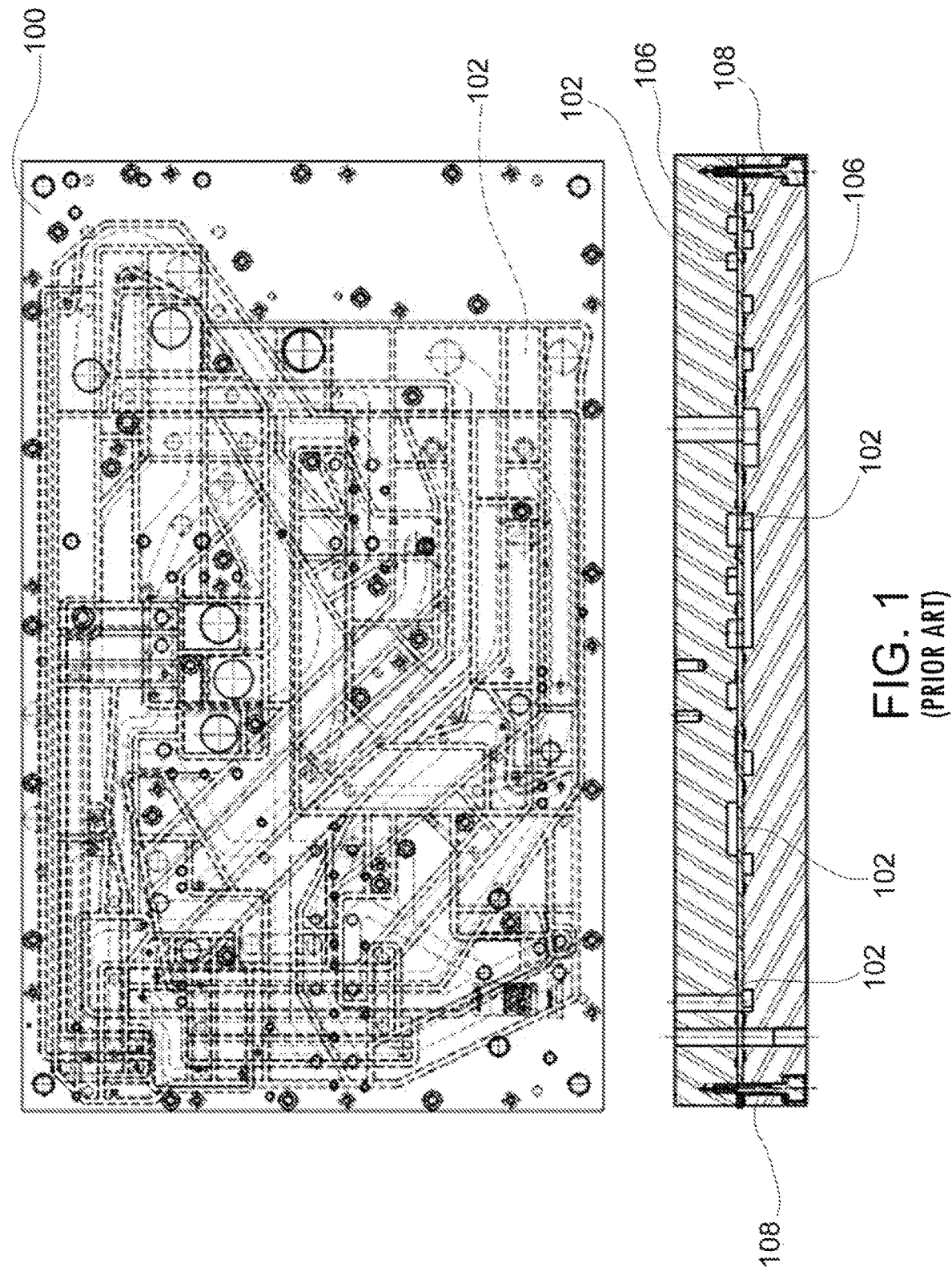
FIG. 1 shows a panel of a brake system constructed according to the prior art.
Figure 2:
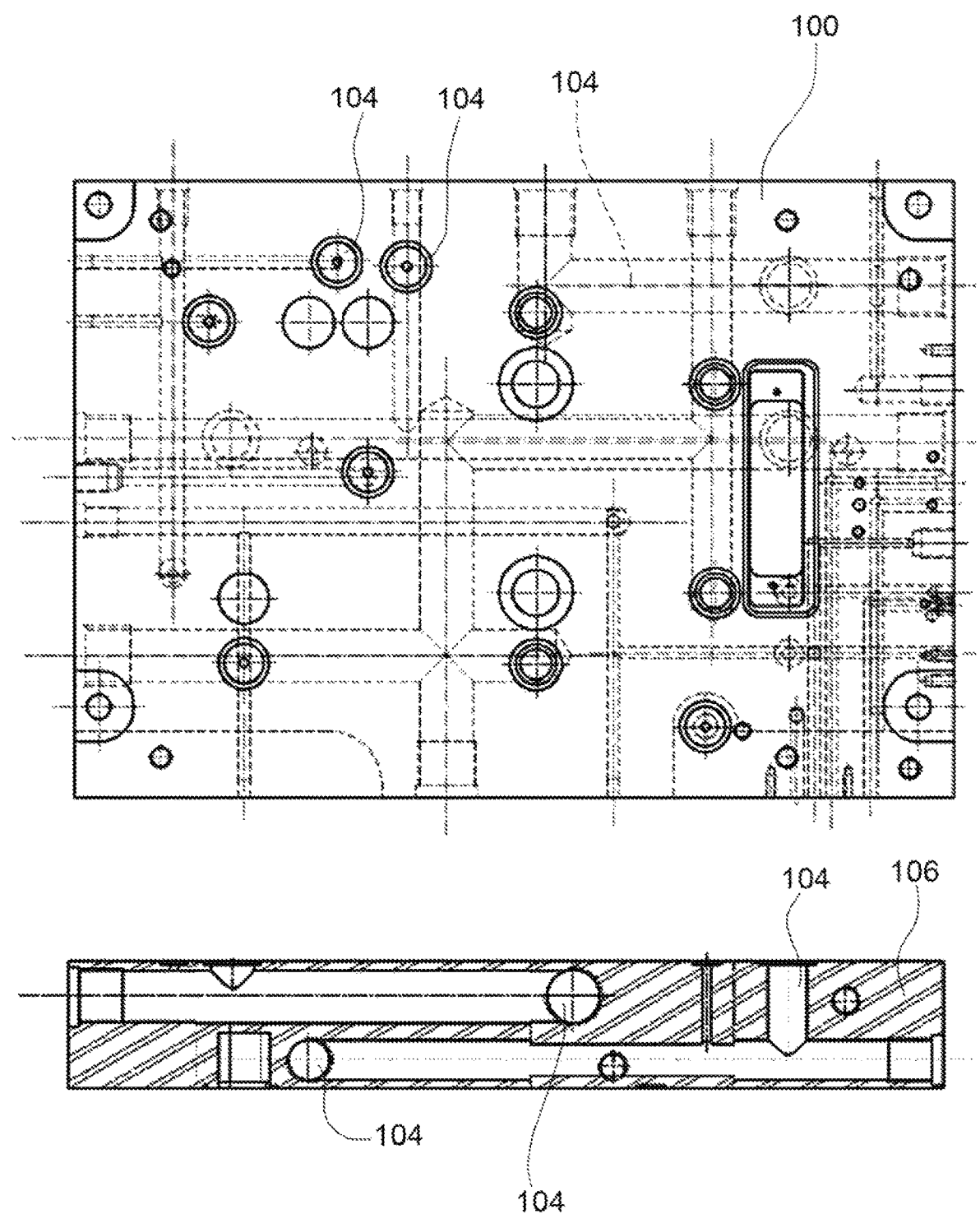
FIG. 2 shows the channels of a layer of a panel of a brake system constructed according to the prior art.
Figure 3:
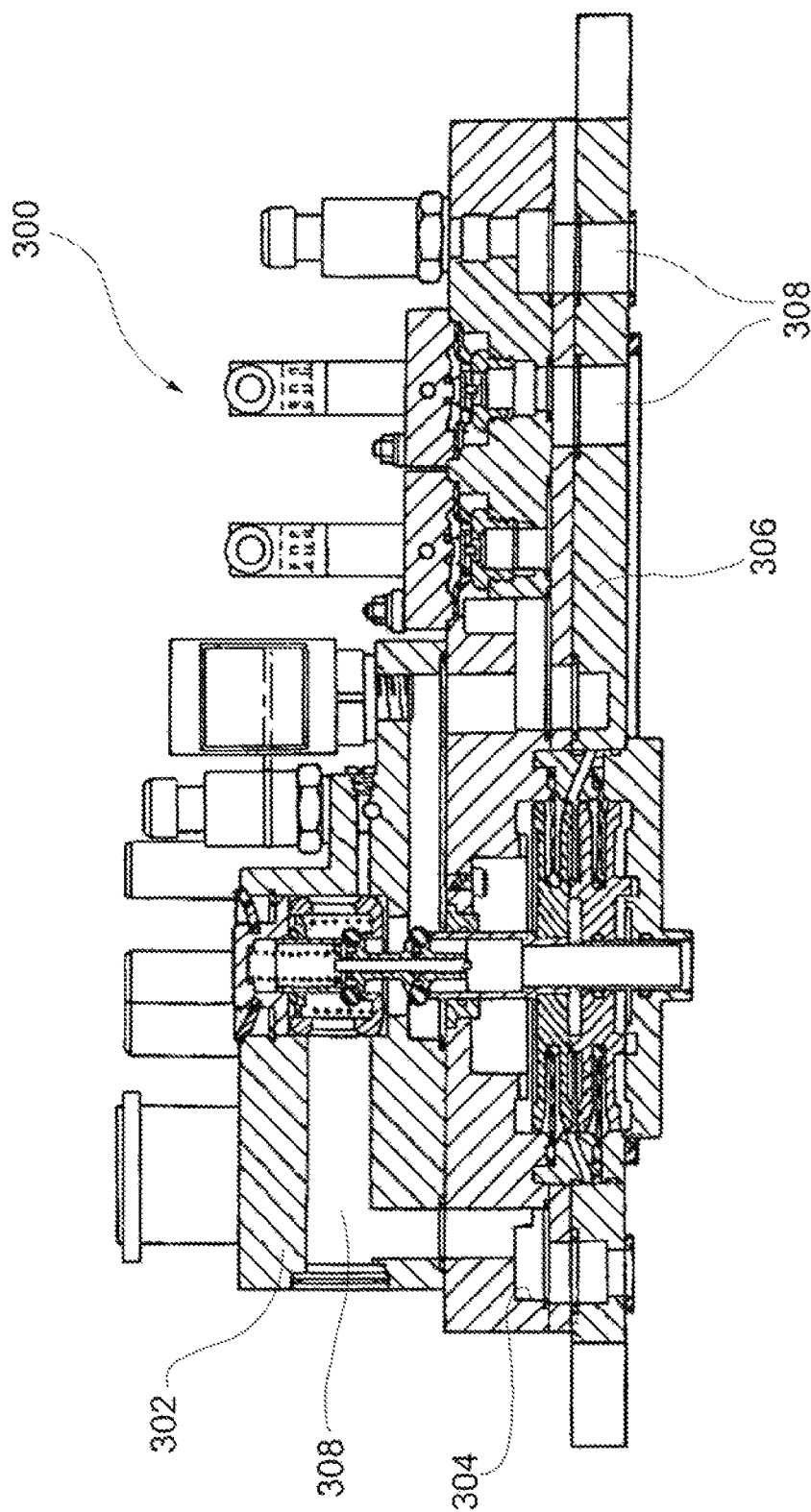
FIG. 3 shows a braking system made according to the prior art.

Before explaining in detail a plurality of embodiments of the invention, it should be clarified that the invention is not restricted in its application to the constructive details and to the configuration of the components presented in the following description or illustrated in the drawings. The invention may assume other embodiments and may in practice be implemented or achieved in different ways. It should also be understood that the phraseology and terminology have descriptive purposes and should not be construed as restrictive. The use of "include" and "comprise" and the variations thereof are to be understood as encompassing the elements stated hereinafter and the equivalents thereof, as well as additional elements and the equivalents thereof.

In the following are described some embodiments of a manufacturing method of a railway braking device that comprises a main body MB (of a pneumatic panel) arranged to receive, at least partially, at least two different (types of) pneumatic or electro-pneumatic elements RV, 414, 416 connecting the at least two pneumatic or electro-pneumatic elements RV, 414, 416.

Different pneumatic or electro-pneumatic elements RV, 414, 416 may mean two elements having structural or functional differences.

This manufacturing method comprises the step of realizing (or making) the main body MB of the railway braking device through additive manufacturing of a monolithic block provided with at least two seats 600, 602 for the at least two (different types of) pneumatic or electro-pneumatic elements RV, 414, 416 and of said channels (for the relay valves RV and the pressure relief valves 414, 416).

In the present text, "additive manufacturing" means the process also known in English as "Additive Manufacturing".

In this way, advantageously, it is no longer necessary to realize the main body in a plurality of layers to be assembled together.

Additive manufacturing is known in English as "Additive Manufacturing" or "3D printing".

The manufacturing method of a railway braking device may further comprise the step of housing components of the at least two pneumatic or electro-pneumatic elements RV, 414, 416 in the main body, after completion of the realization of the main body MB of the railway braking device, and the step of coupling to the main body MB, closing elements CE arranged to hold the components of the at least two pneumatic or electro-pneumatic elements RV, 414, 416 in position in the railway braking device.

For example, the components of the at least two pneumatic or electro-pneumatic elements RV, 414, 416 are rods and/or membranes and/or O-rings and/or springs, etc.

The closing elements CE may be simple covers made of plastic or metal that may be coupled to the main body MB by means of hooking/interlocking or by fixing means, such as glues, screws, etc. The closing elements may, but not necessarily, be manufactured also by additive manufacturing.

In a further aspect, the material used for the additive manufacturing of the step of realizing said main body MB is of a metallic type, and/or the material used for the additive manufacturing of the step of realizing said closing elements CE is of the metallic type.

At least one of the pneumatic or electro-pneumatic elements RV, 414, 416 of the railway braking device may be a pneumatic relay valve RV. In addition, or alternatively, at least one of the pneumatic or electro-pneumatic elements RV, 414, 416 of the railway braking device may be a pressure relief valve 414, 416.

Figure 6:
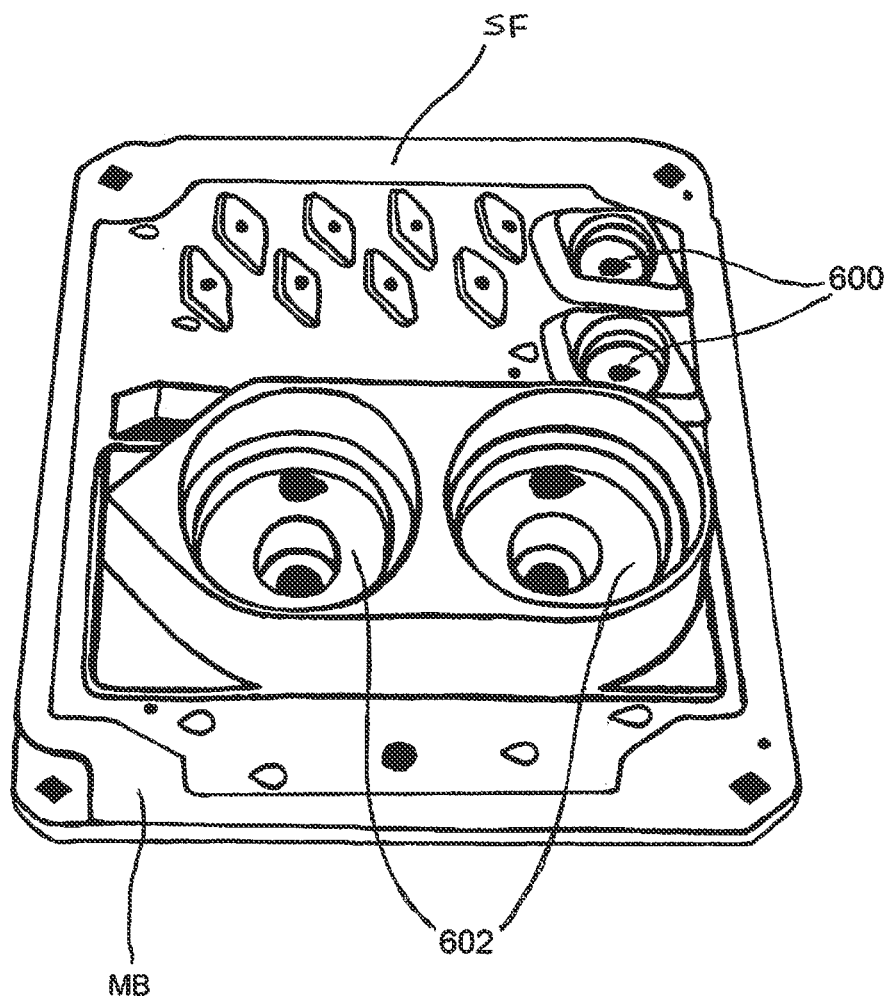
FIG. 6 is a prospective view of an exemplary main body of a railway braking device, when constructed by means of additive manufacturing.

FIG. 6 illustrates a prospective view of an exemplary main body MB of a railway braking device D, when realized (or made real/fabricated/manufactured) by means of additive manufacturing or 3D printing.

With 600, 602 are illustrated the seats/compartments wherein the at least two different pneumatic or electro-pneumatic elements RV, 414, 416 are to be housed. In particular, with 600 are illustrated the seats/compartments wherein the pneumatic relay valves RV are to be housed and at 602 the seats/compartments wherein the pressure relief valves 414, 416 are to be housed.

The pneumatic or electro-pneumatic elements RV, 414, 416 may have their respective pneumatic ports arranged to interface said railway braking device (D) with a support flange, for example, the support flange SF as shown in FIG. 6 surrounding a periphery of a face of the main body MB and comprising corresponding pneumatic ports positioned within respective seats/compartments 600, 602. In this case, the manufacturing method may comprise the step of realizing the main body MB of the railway braking device D by means of additive manufacturing, so that the pneumatic ports of said pneumatic or electro-pneumatic elements RV, 414, 416 are arranged in the main body MB so as to emerge from a single face of the main body MB of the railway braking device D.

Preferably, in one example, the pneumatic ports are pneumatic ports intended for a functional interface and not intended for a diagnostic interface.

The invention further concerns a railway braking device D constructed according to any one of the embodiments described above.

Moreover, the main body MB of the railway braking device may comprise a functional volume therein. For example, the functional volume may be arranged to contain therein a gas or fluid from which the pneumatic elements may draw out or introduce said gas or fluid.

The pneumatic or electro-pneumatic elements of the railway braking device D may have their respective pneumatic ports arranged to interface the railway braking device with a support flange comprising corresponding pneumatic ports. The pneumatic ports of the pneumatic or electro-pneumatic elements RV, 414, 416 may thus be arranged in the main body so as to emerge from a single face of the main body of the railway braking device. Preferably, in one example, the pneumatic ports are pneumatic ports intended for a functional interface and not intended for a diagnostic interface.

Figure 4A:
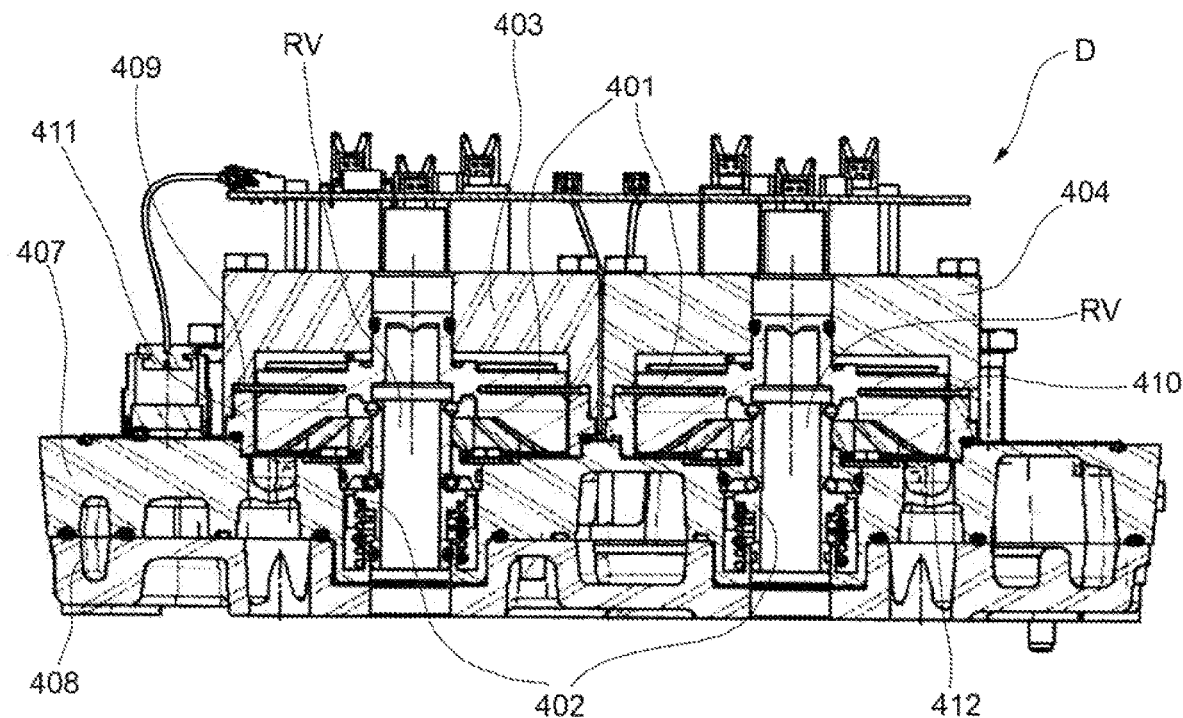
FIG. 4A is a first view of an example braking device constructed with three metal layers according to the prior art.
Figure 4B:
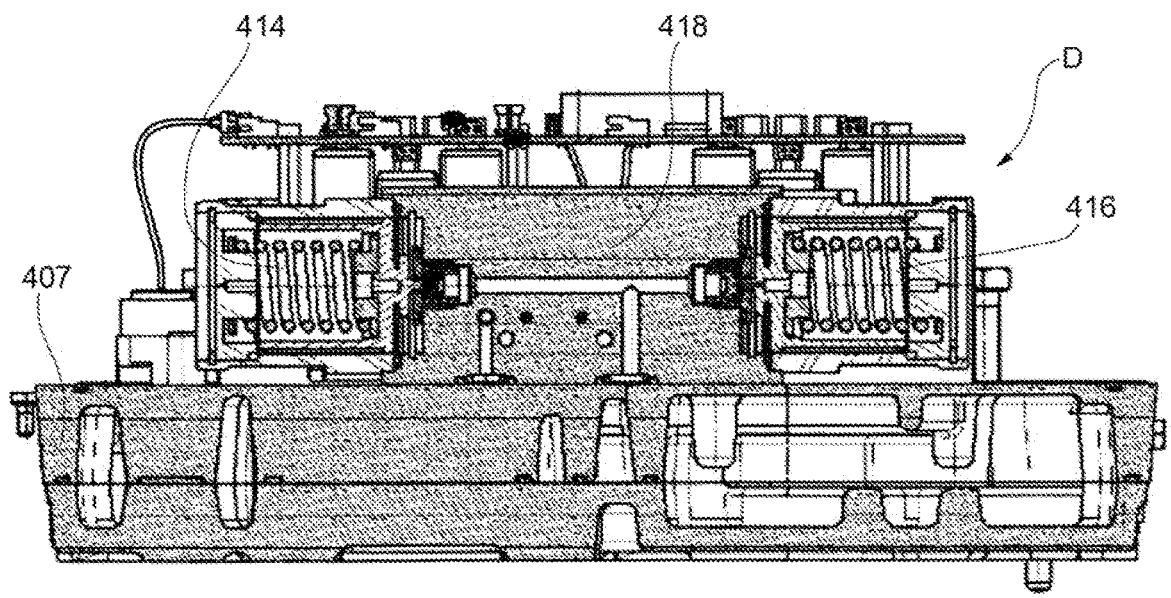
FIG. 4B shows a second view of the example braking device in FIG. 4A.

Referring to FIGS. 4A and 4B, two views of an example of a braking device D constructed with three metal layers according to the prior art are illustrated. In this example, the main body is realized using traditional mechanical processing techniques.

The braking device D comprises pneumatic or electro-pneumatic elements in the form of relay valves RV. The moving parts of the relay valves RV are formed by parts 401, 402, respectively. The main body of said relay valves RV making up the seat and any pneumatic connection channels is made up of the layers 407, 408, respectively. The covers 403, 404 form additional perforated passages, not visible in the figure, to supply and empty pilot chambers, respectively. The membranes 409, 410 are supported respectively by two rings 411, 412, which require O-rings respectively to ensure pneumatic sealing.

Moreover, the main body, made up of the two plates 407 and 408 screwed together, performs the function of support panel, pneumatic connection and integration for other electro-pneumatic functions.

In short, the main body of the braking device D comprises the layers/plates 403, 404, 407 and 408.

Due to the coupling of the two plates 407 and 408, it is possible to obtain a functional volume in the volumetric parts of the plates 407, 408 not occupied by the connection channels. The pneumatic sealing of the two plates 407, 408 required for isolating the channels from each other and for generating the functional volume is guaranteed by gaskets.

FIG. 4B shows relief valves 414, 416. A metallic block 418 forms a support base for both relief valves 414, 416. This support is made separately from the plate 407, in order to be able to construct the channels connecting the relief valves 414, 416, as well as electro-pneumatic valves and pressure sensors.

In the prior art, the channels could not have been obtained directly on the plate 407 due to the number and complexity of crossings. Thus, the metal block 418 is subsequently coupled to the plate 407 by means of screws, and the seal between the two parts is ensured by O-rings.

Figure 5A:
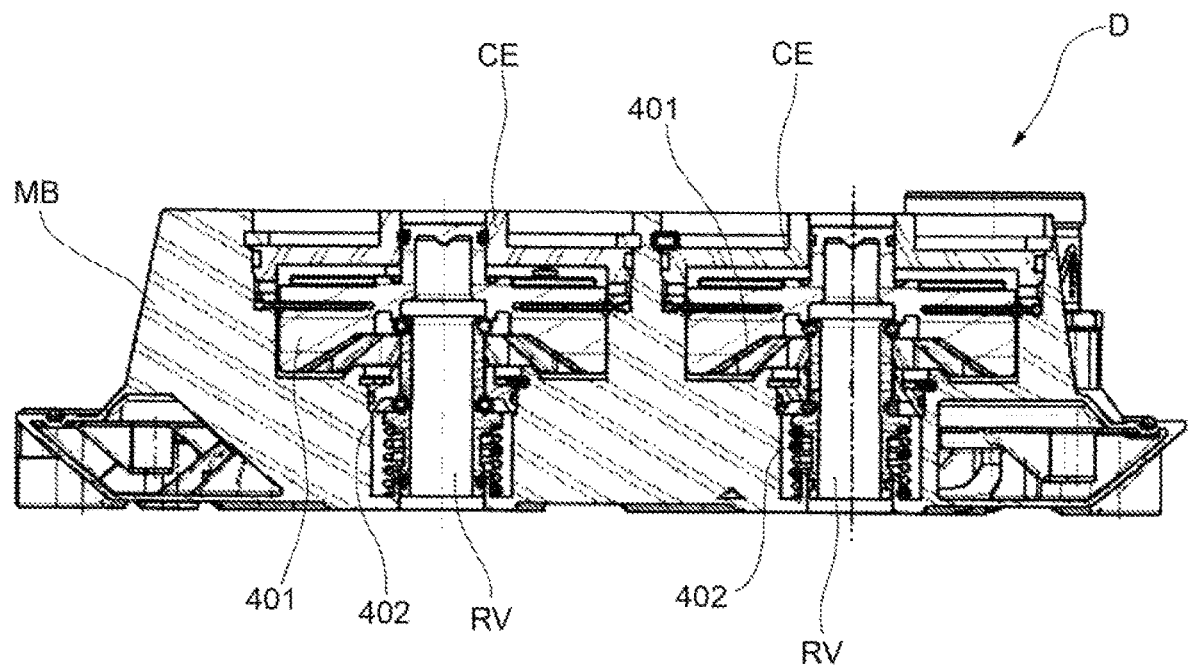
FIG. 5A is a first view of an example braking device in the case wherein it is constructed using the method of the invention.
Figure 5B:
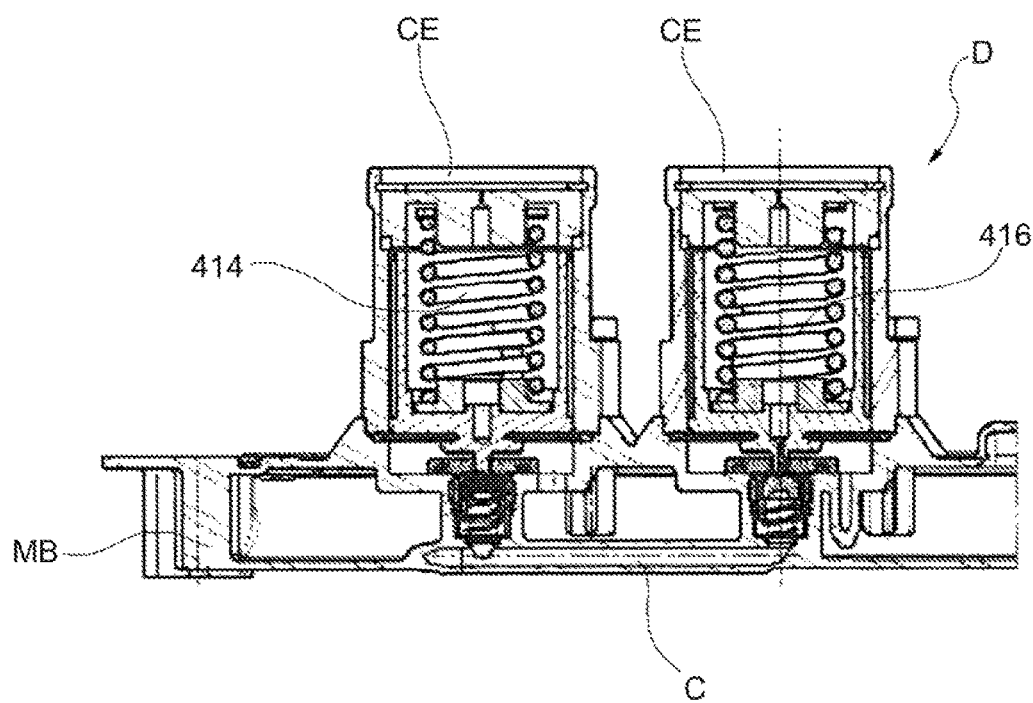
FIG. 5B shows a second view of the example braking device in FIG. 5A.

FIG. 5A and FIG. 5B illustrate two views of an example of a braking device, similar to those of FIGS. 4A and 4B, in the case wherein the main body is made by the method of the invention.

As seen in FIG. 5A, the main body of the braking device, i.e. the layers/plates 403, 404, 407 and 408 of FIG. 4A, are constructed in a monolithic block by means of additive manufacturing.

The main body MB of the braking device is constructed in a monolithic block by additive manufacturing. The main body MB also forms the supply channels, not visible in the figures, to the pilot chambers, as well as the channels necessary to connect the relay valves RV to other components of the braking device. The metallic block 418 is eliminated in the equivalent solution made with an additive manufacturing process. In effect, all of the interconnection channels C between the relief valves 414, 416 are obtained directly in the single main body MB. FIG. 5A also shows the closing elements CE to the main body MB arranged to hold the at least two pneumatic elements in position in the railway braking device D. The method of the present invention thus has the following advantages:
  reduction in the number of components making up the braking device;
  reduction in the amount of manual assembly work of the braking device, resulting in reduced production time and fewer failures;
  elimination of any O-rings and gaskets, with consequent improvement of the perfect pneumatic seal, reduction of assembly time, reduction of production failures;
  optimization of the lengths of the connection channels between the pneumatic or electro-pneumatic elements, for example between electro-pneumatic valves and the pilot chambers of the relay valves, reducing the implementation delays of said relay valves;
  direct integration between the body of the pneumatic or electro-pneumatic elements and the panel making up the connection system between the various pneumatic or electro-pneumatic elements;
  optimization of the paths of the channels between the various pneumatic or electro-pneumatic elements, for example avoiding right angle connections typical of the solutions obtained by drilling, which causes vortexes and consequent air propagation delays; and
  reduction of the thickness of the walls of the main body of the braking device, which is impossible to obtain through machining by machine tool or sand castings, with consequent lightening of the complete system.

Various aspects and embodiments of a manufacturing method of a railway braking device and a railway braking device according to the invention have been described. It is understood that each embodiment may be combined with any other embodiment. The invention, moreover, is not restricted to the described embodiments, but may be varied within the scope defined by the accompanying claims.

The invention claimed is:

1. A manufacturing method of a railway braking device comprising a single main body within which:
  at least two different pneumatic or electro-pneumatic elements are received, the at least two different pneumatic or electro-pneumatic elements comprising at least two elements having structural or functional differences; and
  channels connecting said at least two pneumatic or electro-pneumatic elements are formed;
the manufacturing method comprising:
  realizing, via additive manufacturing, said main body of the railway braking device so as to comprise a monolithic block having at least two seats for receiving said at least two different pneumatic or electro-pneumatic elements and said channels connecting the at least two different pneumatic or electro-pneumatic elements, wherein all of the channels interconnecting the at least two different pneumatic or electro-pneumatic elements are formed within the realized single main body.

2. The manufacturing method of claim 1, further comprising:
  after realizing, via additive manufacturing, the main body of the braking device, receiving components of said at least two pneumatic or electro-pneumatic elements into the main body; and
  after receiving components of the at least two pneumatic or electro-pneumatic elements, coupling closing elements to the main body, the closing elements being arranged to retain the components of said at least two pneumatic or electro-pneumatic elements in position in the railway braking device.

3. The manufacturing method of claim 2, further comprising:
  constructing said closing elements by means of additive manufacturing.

4. The manufacturing method of claim 2, wherein a material used for additive manufacturing said main body is of a metallic type, and/or the material used for additive manufacturing of said closing elements is of the metallic type.

5. The manufacturing method of claim 1, wherein said pneumatic or electro-pneumatic elements have respective pneumatic ports arranged to interface said railway braking device with a support flange comprising corresponding pneumatic ports, and wherein the method comprises
  realizing, via additive manufacturing, said main body of the railway braking device so that the corresponding pneumatic ports are arranged in the main body so as to emerge from a single face of the main body of the railway braking device.

6. A railway braking device comprising:
a single main body within which at least two different pneumatic or electro-pneumatic elements are received, the at least two different pneumatic or electro-pneumatic elements comprising at least two elements having structural or functional differences, wherein
channels connecting the at least two pneumatic or electro-pneumatic elements are formed within the main body, wherein
the single main body includes a support flange, the support flange surrounding a periphery of a face of the main body and comprising at least two seats sized and configured for receiving the at least two different pneumatic or electro-pneumatic elements, wherein
each of the at least two different pneumatic or electro-pneumatic elements are positioned within the face of the main body, and wherein
the main body is realized by a manufacturing method comprising realizing, via additive manufacturing, the main body so as to comprise a monolithic block having the at least two seats for receiving the at least two different pneumatic or electro-pneumatic elements and the channels connecting the at least two different pneumatic or electro-pneumatic elements, wherein all of the channels interconnecting the at least two different pneumatic or electro-pneumatic elements are formed within the realized single main body.

7. The device of claim 6, wherein at least one of said pneumatic or electro-pneumatic elements is a pneumatic relay valve.

8. The device of claim 6, wherein at least one of said pneumatic or electro-pneumatic elements is a pressure relief valve.

9. The device of claim 6, wherein the main body comprises a functional volume therein.

10. The device of claim 6, wherein said pneumatic or electro-pneumatic elements have respective pneumatic ports arranged to interface said railway braking device with the support flange comprising corresponding pneumatic ports, and wherein
the corresponding pneumatic ports are arranged in the main body so as to emerge from a single face of the main body of the railway braking device, the single face being the face of the main body, and the corresponding ports positioned within respective ones of the at least two seats for receiving the at least two different pneumatic or electro-pneumatic elements.

* * * * *